US006843292B2

(12) United States Patent
Wang

(10) Patent No.: US 6,843,292 B2
(45) Date of Patent: Jan. 18, 2005

(54) THERMOPLASTIC BLEND

(75) Inventor: Hsien-Chang Wang, Bellaire, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 86 days.

(21) Appl. No.: 10/297,738

(22) PCT Filed: Jun. 8, 2001

(86) PCT No.: PCT/US01/18594
§ 371 (c)(1),
(2), (4) Date: Jul. 3, 2003

(87) PCT Pub. No.: WO01/96466
PCT Pub. Date: Dec. 20, 2001

(65) Prior Publication Data
US 2004/0024119 A1 Feb. 5, 2004

Related U.S. Application Data

(63) Continuation-in-part of application No. 09/594,650, filed on Jun. 15, 2000, now Pat. No. 6,376,598.

(51) Int. Cl.[7] .............................. B60C 5/14; C08L 77/00
(52) U.S. Cl. ....................... 152/450; 152/151; 152/450; 152/510; 152/512; 152/548; 524/502; 524/503; 524/508; 524/513; 524/514; 524/517; 524/271; 524/519; 525/76; 525/150; 525/151; 525/153; 525/165; 525/177; 525/178; 525/184; 525/207; 525/213
(58) Field of Search ................................. 524/502, 503, 524/508, 514, 513, 517, 271, 519; 525/76, 150, 151, 153, 165, 177, 170; 152/450, 151, 510, 512, 540

(56) References Cited

U.S. PATENT DOCUMENTS

| 3,037,954 | A | 6/1962 | Gessler et al. .............. 260/29.8 |
| 3,067,182 | A | 12/1962 | Jones ......................... 260/7.5 |
| 3,948,868 | A | 4/1976 | Powers ....................... 260/80.7 |
| 4,074,035 | A | 2/1978 | Powers et al. ............... 526/185 |
| 4,173,556 | A | 11/1979 | Coran et al. ........... 260/30.8 R |
| 4,197,379 | A | 4/1980 | Coran et al. ................. 525/142 |
| 4,207,404 | A | 6/1980 | Coran et al. ................. 525/184 |
| 4,297,453 | A | 10/1981 | Coran et al. ................. 525/408 |
| 4,338,413 | A | 7/1982 | Coran et al. ................. 525/179 |
| 4,348,502 | A | 9/1982 | Coran et al. ................. 525/183 |
| 4,419,499 | A | 12/1983 | Coran et al. ................. 525/424 |
| 5,629,386 | A | 5/1997 | Osman ........................ 525/354 |
| 5,910,544 | A | 6/1999 | Ozawa et al. ................ 525/178 |
| 6,028,147 | A | 2/2000 | Ogawa et al. ............... 525/292 |
| 6,376,598 | B1 * | 4/2002 | Wang |

FOREIGN PATENT DOCUMENTS

| DE | 42 15 120 A1 | 11/1992 | ............. F16L/11/08 |
| EP | 0 542 875 B1 | 8/1952 | ........... C08L/23/22 |
| EP | 0 744 411 A2 | 11/1996 | .............. C08F/8/24 |
| EP | 0 905 156 A1 | 3/1999 | .......... C08F/297/00 |
| EP | 0 969 039 A1 | 1/2000 | ........... C08L/19/00 |
| GB | 677 350 | 11/1952 | |
| WO | WO 92 01575 A1 | 2/1992 | .............. B60C/1/00 |
| WO | WO 92 02582 A1 | 2/1992 | ........... C08L/23/22 |
| WO | WO 97 31955 A1 | 9/1997 | ............. C08F/8/00 |

OTHER PUBLICATIONS

Abstract of Patent DE 42 15 120 A.
*Polymer–Solvent Interaction Parameters*, Rubber Chemistry and Technology, vol. 39, No. 1, (1966), pp. 149–192, Division of Rubber Chemistry of The American Chemical Society, Inc., Florham Park, New Jersey.
*Polyester Fibers to Rayon*, Encyclopedia of Polymer Science and Technology, vol. II (1969), pp. 68–73, John Wiley & Sons, New York.
*Phenolic Resins to Polyelectrolytes*, Encyclopedia of Polymer Science and Technology, vol. 10 (1969), pp. 392–414, John Wiley & Sons, New York.
*Polyamides*, Concise Encyclopedia of Polymer Science and Engineering (1990), pp. 748–761, John Wiley & Sons, New York.

* cited by examiner

*Primary Examiner*—Ana Woodward
(74) *Attorney, Agent, or Firm*—Paige Schmidt; Kevin M. Faulkner; Leandro Arechederra

(57) ABSTRACT

The invention generally relates to thermoplastic blends having improved properties. Optionally, these blends may be dynamically vulcanized. More specifically, this invention is directed to a composition comprising a blend of chloromethylated(styrene-isobutylene) polymer and a thermoplastic resin selected from the group consisting of polyamides, polyesters, polycarbonates, polysulfones, polyacetals, polyacetones, acrylonitrile-butadiene styrene resins, polyphenylene oxide, polyphenylene sulfide, styrene-acrylonitrile resins, styrene-maleic anhydride resins, polyamides, aromatic polyketones, ethylene vinyl alcohol polymer and mixtures thereof. Tires and tire components such as air permeation prevention films comprising these compositions are also provided.

63 Claims, No Drawings

THERMOPLASTIC BLEND

CROSS REFERENCE TO RELATED APPLICATIONS

This application is a CIP of Ser. No. 09/594,650, filed Jun. 15, 2000, now U.S. Pat. No. 6,376,598, herein incorporated by reference in its entirety.

FIELD

The invention relates to thermoplastic blends having improved properties. Optionally, these blends may be dynamically vulcanized.

BACKGROUND

Significant research has been conducted in an effort to find polymer blends which have a combination of both elastic and thermoplastic properties. These polymer blends have been given the generic designation of Thermoplastic Olefins ("TPO"). They exhibit some of the properties of a cured elastomer as well as the reprocessability of thermoplastic resins. The elastomeric characteristics may be enhanced if one component of the blend is a vulcanizable elastomer which is wholly or partially crosslinked.

The earliest work in the curing of TPO compositions was by Gessler and Haslett in U.S. Pat. No. 3,037,954. That patent teaches the concept of "dynamic curing" wherein a vulcanizable elastomer is dispersed into a resinous thermoplastic polymer and the elastomer cured while continuously mixing and shearing the polymer blend. The result is a micro-gel dispersion of cured rubber in an uncured matrix of resinous thermoplastic polymer. Gessler's U.S. Pat. No. 3,037,954 discloses compositions comprising polypropylene and a rubber wherein the rubber may be butyl rubber, chlorinated butyl rubber, polybutadiene, polychloroprene and polyisobutylene. Compositions of 50 to 95 parts polypropylene and 5 to 50 parts of rubber are disclosed.

Dynamically vulcanized thermoplastic compositions comprising a polyamide and various types of elastomers are known. See, for example, U.S. Pat. No. 4,173,556; U.S. Pat. No. 4,197,379; U.S. Pat. No. 4,207,404; U.S. Pat. No. 4,297,453; U.S. Pat. No. 4,338,413; U.S. Pat. No. 4,348,502; U.S. Pat. No. 4,419,499, and U.S. Pat. No. 6,028,147. Specifically, U.S. Pat. No. 6,028,147 to Ogawa et al. discloses a triblock polymer including methylstyrene and p-(chloromethyl)styrene. Also, EP 0 542 875 to Dharmarajan et al discloses a polymer having halo para-methylstyrene derived unit within the polymer. None of these disclosures discloses a polymer having both meta and para-halogenated methylstyrenes and having improved durability and lower air permeability.

SUMMARY

It has now been found that compositions comprising a thermoplastic resin and chloromethylated(styrene-isobutylene) random polymer or "tetramer" that includes styrene-derived units, p-(chloromethyl)styrene derived units, and m-(chloromethyl)styrene derived units have improved properties which make them particularly useful in the manufacture of tires in thermoplastic blends. The compositions may also comprise uncured or dynamically cured elastomers.

Thus, the present invention is directed generally to a composition comprising a blend of chloromethylated (styrene-isobutylene) tetramer and a thermoplastic resin selected from the group consisting of polyamides, polyesters, polycarbonates, polysulfones, polyacetals, polyacetones, acrylonitrile-butadiene styrene resins, polyphenylene oxide, polyphenylene sulfide, styrene-acrylonitrile resins, styrene-maleic anhydride resins, polyamides, aromatic polyketones, ethylene vinyl alcohol polymer and mixtures thereof. Tires and tire components such as air permeation prevention films comprising these compositions are also provided.

DESCRIPTION

The thermoplastic compositions of the present invention comprise a blend of a thermoplastic resin and a chloromethylated(styrene-isobutylene) polymer. The blend may be an unvulcanized composition or may be statically vulcanized or subjected to dynamic vulcanization.

The term "dynamic vulcanization" is used herein to mean a vulcanization process in which the resin and chloromethylated(styrene-isobutylene) polymer are vulcanized under conditions of high shear. As a result, the vulcanizable elastomer is simultaneously crosslinked and dispersed as fine particles of a "micro gel" within the resin matrix.

Dynamic vulcanization is effected by mixing the resin and chloromethylated(styrene-isobutylene) polymer at a temperature which is at or above the curing temperature of the polymer in equipment to provide high shear such as roll mills, Banbury™ mixers, continuous mixers, kneaders or mixing extruders, e.g., twin screw extruders. One unique characteristic of the dynamically cured compositions is that, notwithstanding the fact that the polymer component may be fully cured, the compositions can be processed and reprocessed by conventional rubber processing techniques such as extrusion, injection molding, compression molding, etc. Scrap or flashing can be salvaged and reprocessed.

The thermoplastic resins suitable for practice of the present invention may be used singly or in combination and are resins containing nitrogen, oxygen, halogen, sulfur or other groups capable of interacting with an aromatic haloalkyl group. Suitable resins include resins selected from the group consisting of polyamides, polycarbonates, polyesters, polysulfones, polylactones, polyacetals, acrylonitrile-butadiene-styrene resins (ABS), polyphenyleneoxide (PPO), polyphenylene sulfide (PPS), styrene-acrylonitrile resins (SAN), polyimides, styrene maleic anhydride (SMA), aromatic polyketones (PEEK, PEK, and PEKK), ethylene vinyl alcohol polymer and mixtures thereof. Preferred thermoplastic resins are polyamides. The more preferred polyamides are Nylon 6 and Nylon 11.

Suitable thermoplastic polyamides (nylons) comprise crystalline or resinous, high molecular weight solid polymers including polymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (Nylon-6), polylauryllactam (Nylon-12), polyhexamethyleneadipamide (Nylon-6,6), poly-hexamethyleneazelamide (Nylon-6,9), polyhexamethylen-esebacamide (Nylon-6,10), polyhexamethyleneisophthala-mide (Nylon-6,IP) and the condensation product of 11-amino-undecanoic acid (Nylon-11). Nylon 6 (N6), Nylon 11 (N11), Nylon 12 (N12), a Nylon 6/66 polymer (N6/66), Nylon 610(N610), and Nylon 612 (N612) may also be used.

Additional examples of satisfactory polyamides (especially those having a softening point below 275° C.) are described in 16 ENCYCLOPEDIA OF CHEMICAL TECHNOLOGY 1–105 (John Wiley & Sons 1968), CONCISE ENCYCLOPEDIA OF POLYMER SCIENCE AND ENGINEERING 748–761 (John Wiley & Sons, 1990), and 10 ENCYCLOPEDIA OF POLYMER SCIENCE AND TECHNOLOGY 392–414 (John Wiley & Sons 1969). Commercially available thermoplastic polyamides may be advantageously used in the practice of this invention, with linear crystalline polyamides having a softening point or melting point between 1600–170° C. being preferred.

Suitable thermoplastic polyesters are those that are linear, crystalline and have high molecular weight. The term "linear" as used herein in respect to polyester means a polymer in which the recurring ester groups are within the polymer backbone and not pendant therefrom. Linear crystalline polyesters having a softening point above 50° C. are satisfactory, with polyesters having a softening point or melting point above 100° C. being preferred, with polyesters having a softening point or melting point between 160° C. to 260° C. being more preferred. Saturated linear polyesters (free of olefinic unsaturation) are preferred, however, unsaturated polyesters may be used provided that the rubber, if cross-linked, is cross-linked prior to blending with the polyester or provided that the rubber is dynamically cross-linked with a cross-linking agent that will not significantly induce cross-link formation in the polyester.

Many commercially available thermoplastic linear crystalline polyesters may be advantageously employed in the practice of the invention or they may be prepared by polymerization of one or more dicarboxylic acids, anhydrides or esters and one or more diol. Examples of satisfactory polyesters include poly(trans-1,4-cyclohexylene C 2–6 alkane dicarboxylates such as poly(trans-1,4-cyclohexylene succinate) and poly(trans-1,4-cyclohexylene adipate), poly (cis or trans-1,4-cyclohexanedimethylene) C 0–2 alkanedicarboxylates such as poly(cis 1,4-cyclohexane-di-methylene)oxalate and poly-(cis 1,4-cyclohexane-di-methylene) succinate, poly(C 2–4 alkylene terephthalates) such as polyethyleneterephthalate and polytetramethylene-terephthalate, poly(C 2–4 alkylene terephthalates) such as polyethyleneterephthalate and polytetramethylene-terephthalate, poly(C 2–4 alkylene isophthalates such as polyethyleneisophthalate and polytetramethylene-isophthalate, poly(p-phenylene C 1–3 alkanedicarboxylates such as poly(p-phenylene glutarate) and poly(p-phenylene adipate), poly(p-xylene oxalate), poly(oxylene oxalate), poly(p-phenylenedi-C 1–5 alkylene terephthalates) such as poly(p-phenylenedimethylene terephthalate) and poly(p-phenylene-di-1,4-butylene terephthalate, poly-(C 2–10 alkylene 1,2-ethylenedioxy-4,4-dibenzoates) such as poly (ethylene-1,2-ethylenedioxy-4,4-dibenzoates), poly-(tetramethylene-1,2-ethylenedioxy-4,4-dibenzoate) and poly-(hexamethylene-1,2-ethylene-dioxy-4,4-dibenzoate), poly(C 3–10 alkylene-4,4-dibenzoates) such as poly (pentamethylene-4,4-dibenzoate), poly(hexamethylene-4,4-dibenzoate and poly(decamethylene-4,4-dibenzoate), poly(C 2–10 alkylene-2,6-naphthalene dicarboxylates) such as poly-(ethylene-2,6-naphthalene dicarboxylates) poly (trimethylene-26-naphthalene dicarboxylates) and poly (tetramethylene-2,6-naphthalene dicarboxylates), and poly-(C 2–10 alkylene sulfonyl-4,4-dibenzoates) such as poly(octamethylene sulfonyl-4,4-dibenzoate) and poly (decamethylene sulfonyl-4,4-dibenzoate.

Additional examples of satisfactory linear polyesters are described in 11 ENCYCLOPEDIA OF POLYMER SCIENCE AND TECHNOLOGY 68–73 (John Wiley & Sons 1969) and Korshak & Vinogradova, POLYESTERS 31–64 (Pergamon Press). Suitable polycarbonates are also commercially available. Poly-lactones such as polycaprolactone are satisfactory in the practice of the invention. Preferred polyesters of the invention are derived from aromatic dicarboxylic acids such as naphthalenic or phthalic acids. More preferred polyesters are poly(alkylene terephthalates) especially polytetramethylene terephthalate), or mixed polyphthalates derived from two or more glycols, two or more phthalic acids, or two or more glycols and two or more phthalic acids such as poly(alkylene terecoisophthalates).

Suitable chloromethylated(styrene-isobutylene) polymers for use as a component of the composition of the present invention comprise from 1 to a 30 mole percent styrene, preferably from 1 to 20 mole percent styrene, and most preferably from 1 to 10 mole percent styrene. Preferably these polymers contain from 0.5 to 10 mole percent chloromethylated styrene, more preferably from 0.5 to 5 mole percent chloromethylated styrene, and most preferably from 0.5 to 2 mole percent chloromethylated styrene.

Stated another way, suitable chloromethylated(styrene-isobutylene) polymers for use as a component of the composition of the present invention comprise at least 0.5 wt % of the chloromethylated styrene moiety (either para or meta isomers) by weight of the polymer, preferably from 1 wt % to 60 wt %, more preferably from 1 to 40 wt %, even more preferably from 2 to 20 wt % of the polymer. The chlorine content of the polymers may range from above zero to 10 wt %, preferably from 0.1 to 7 wt %.

Various methods may be used to produce the chloromethylated(styrene-isobutylene) polymers. Specific methods are described in U.S. Pat. Nos. 4,074,035 and 5,629,386. Preferably the polymer is prepared such that it is homogeneous. Methods for preparing such homogenous (i.e., essentially free of homopolymer) polymers are described in U.S. Pat. No. 3,948,868. Generally this method involves modifying the process such that essentially equal reactivity ratios are achieved for styrene and isobutylene. The polymer, or "tetramer", is prepared by contacting under suitable polymerization conditions isobutylene monomers, styrene monomers, and a halomethylating agent, thus generating a random copolymer or tetramer having four different monomer-derived units: the isobutylene derived units, the styrene derived units, and both meta- and para-halomethylated-styrene units.

More specifically, in one embodiment of the invention, the chloromethylated(styrene-isobutylene) polymer is a chloromethylated "tetramer" of four distinct monomers: isobutylene, styrene, p-(chloromethyl)styrene, and m-(chloromethyl)styrene. A representative structure of this tetramer is shown below below:

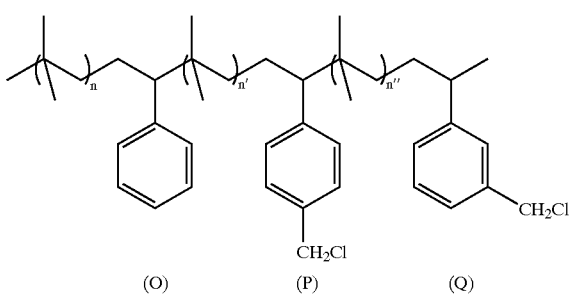

wherein the subscript "n", "n'", and "n''" represent the number of isobutylene derived units in a tetramer chain and can be the same or different, "O" represents the number of styrene derived units in the tetramer chain, "P" represents the number of p-(chloromethyl)styrene derived units in the tetramer chain, and "Q" represents the number of m-(chloromethyl)styrene derived units in the tetramer chain. The chloromethylated(styrene-isobutylene) tetramer of the invention is a random polymer of the four units described above, and it is understood that the above structure is merely descriptive of the tetramer. In one embodiment of the chloromethylated(styrene-isobutylene) tetramer, the chloromethylated styrenic units are a heterogeneous mixture such that the ratio of the para to meta isomer may vary.

In the compositions of the present invention, the thermoplastic resin(s) may suitably be present in an amount ranging from 10 to 98 wt %, preferably from 20 to 95 wt %, the chloromethylated(styrene-isobutylene) polymer may be present in an amount ranging from 2 to 90 wt %, preferably from 5 to 80 wt %, based on the polymer blend.

The secant flexural modulus of the thermoplastic compositions may range from 100 kg/cm$^2$ to 400,000 kg/cm$^2$ preferably from 200 kg/cm$^2$ to 100,000 kg/cm$^2$ measured according to ASTM D790 at 1% strain.

The polymer blend may comprise 25 to 98 wt %. Percent of the overall composition. In addition to its polymer components, the composition of the present invention may comprise fillers, and additives such as antioxidants, stabilizers, rubber processing oils lubricants (e.g., oleamide), antiblocking agents, waxes, foaming agents, flame retardants, pigments, coupling agents for the fillers and other processing aids known to the rubber compounding art. Metal oxides, e.g., MgO, can be included to act as acid acceptors. The pigments and fillers may comprise up to 30 wt %. Percent of the total composition based on polymer components plus additives. Preferably, the pigments and fillers comprise 1 to 30 wt %. Percent based on the composition, more preferably 2 to 20 wt % of the overall composition.

Suitable fillers include talc, calcium carbonate, glass fibers, clays, silica, carbon black and mixtures thereof. Any type of carbon black can be used, such as channel blacks, furnace blacks, thermal blacks, acetylene black, lamp black and the like. Titanium dioxide, also considered a pigment, can be used to impart a white color to the final product.

Rubber process oils have particular ASTM designations depending on whether they fall into the class of paraffinic, naphthenic or aromatic process oils. The type of process oil utilized will be that customarily used in conjunction with the rubber component. The skilled rubber chemist will recognize which type of oil should be utilized with a particular rubber. The quantity of rubber process oil utilized is based on the total rubber content, and can be defined as the ratio, by weight, of process oil to the rubber in the composition. This ratio can vary from 0.3/1 to 1.3/1; preferably 0.5/1 to 1.2/1; more preferably 0.8/1 to 1.1/1. Oils other than petroleum based oils such as oils derived from coal tar and pine tar can also be utilized. In addition to the petroleum-derived rubber process oils, organic esters and other synthetic plasticizers can be used. As used herein, the term "process oil" means both the petroleum derived process oils and synthetic plasticizers.

The process oil may be included in the composition to insure that the composition has good flow properties. The quantity of oil utilized will depend in part on the amount of polymer blend and filler used as well as, to some extent, the type of cure system utilized. Generally, the process oil, when included, may comprise 30 wt. Percent of the composition. Larger amounts of process oil can be used, the deficit being reduced physical strength.

Antioxidants may be utilized in the composition of this invention to enhance further the improved aging properties of the elastomeric polymer component of the present invention and to protect the resins. The particular antioxidant utilized will depend on the rubbers and plastics utilized and more than one type may be required. Their proper selection is well within the skill of the rubber chemist. Antioxidants will generally fall into the class of chemical protectors or physical protectants. Physical protectants are used where there is to be little movement in the part to be manufactured from the composition. These are generally waxy materials which impart a "bloom" to the surface of the rubber part and form a protective coating or shield the part from oxygen, ozone, etc.

The chemical protectors generally fall into three chemical groups: secondary amines, phenolics and phosphites. Illustrative, non-limiting examples of types of antioxidants useful in the practice of this invention are hindered phenols, amino phenols, hydroquinones, alkyldiamines, amine condensation products, etc. Nonlimiting examples of these and other types of antioxidants are styrenated phenol; 2,2'-methylene-bis-(4-methyl-6-1, butylphenol); 2,6'-di-t-butyl-o-dimethylamino-p-cresol; hydroquinone monobenzyl ether, octylated diphenylamine, phenyl-beta-naphthlylamine; N,N'-diphenylethylene diamine; aldol-alpha-naphthylamine; N,N'-di-phenyl-p-phenylene diamine, etc. The physical antioxidants include mixed petroleum waxes and microcrystalline waxes.

It is within the scope of this invention to incorporate an uncured rubber in combination with a dynamically vulcanized rubber in the composition. This can be accomplished by selecting as the uncured rubber a rubber which cannot be vulcanized by the vulcanizing agent used to cure the chloromethylated(styrene-isobutylene) polymer component of the present invention which is to be dynamically vulcanized or by adding to the dynamically vulcanized thermoplastic composition, after the vulcanization agent has been fully consumed, a rubber which is vulcanizable by the vulcanization agent used to vulcanize the chloromethylated (styrene-isobutylene) polymer component of the present invention. For example, when the chloromethylated(styrene-isobutylene) polymer component of the present invention is vulcanized with a cure system which comprises zinc oxide, any other rubber which requires sulfur or another curative to vulcanize it or which is not vulcanizable can be included. Such rubbers include ethylene-propylene polymers (EPM), ethylene-propylene-diene polymers (EPDM), butyl rubbers, halogenated butyl rubbers, natural rubber, etc. Alternatively, the DVA can be prepared first from the resin and vulcanizable elastomer by dynamic vulcanization and subsequently, an uncured rubber can be blended into the DVA at a temperature above the melting point of the thermoplastic resin. In the embodiment in which an uncured rubber is incorporated in the dynamically vulcanized composition, the uncured rubber may be present in an amount ranging from above zero to 25, preferably from 5 to 20 wt % of the total rubber (i.e., elastomer) content of the composition.

When it is desired to produce a vulcanized composition, any conventional curative system which is capable of vulcanizing saturated halogenated polymers may be used to vulcanize at least the chloromethylated(styrene-isobutylene) polymer, except that peroxide curatives should be avoided when the thermoplastic resins chosen as components are such that peroxide would cause these thermoplastic resins themselves to crosslink.

Furthermore, any curative which would cause the particular resin being used to crosslink under the processing conditions being used to prepare the dynamically vulcanized alloy should be excluded from the curative system used.

Suitable curative systems for the chloromethylated(styrene-isobutylene) polymer component of the present invention include zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2,4,6-trimercapto-5-triazine), ZDEDC (zinc diethyl dithiocarbamate) and other dithiocarbamates, Tetrone A (dipenta-methylene thiuram hexasulfide), Vultac-5 (alkylated phenol disulfide), SP1045 (phenol formaldehyde resin), SP1056 (brominated alkyl phenol formaldehyde resin), DPPD (diphenyl phenylene diamine), salicyclic acid (o-hydroxy benzoic acid), wood rosin (abietic acid), and TMTDS (tetramethyl thiuram disulfide) in combination with sulfur. The vulcanization is conducted at conditions to vulcanize at least partially, preferably fully, the chloromethylated(styrene-isobutylene) polymer.

In the practice of this invention, the resin, the chloromethylated(styrene-isobutylene) polymer and optional other polymers and/or additives are mixed together at a temperature sufficient to soften the resin or, more commonly, at a temperature above its melting point when the resin is crystalline at room temperature. If the mixture is to be dynamically vulcanized, after the resin and other polymers have been intimately mixed, the curative or curatives are added. Heating and masticating at vulcanization temperatures are generally adequate to complete vulcanization in 0.5 to 10 minutes. The vulcanization time can be reduced by elevating the temperature of vulcanization. A suitable range of vulcanization temperatures is from the melting point of the matrix resin to 300° C.; more typically, the temperature may range from the melting point of the matrix resin to 275° C. Preferably the vulcanization is carried out at a temperature range from the flux temperature of the polymer blend to 20° C. above the softening or melting temperature of the matrix resin.

It is preferred that the mixing process be continued until the desired level of vulcanization is completed. If vulcanization is permitted to continue after mixing has stopped, the composition may not be reprocessable as a thermoplastic. However, the dynamic vulcanization can be carried out in stages. For example, vulcanization can be commenced in a twin screw extruder and pellets formed of the DVA material using an underwater pelletizer thereby quenching the vulcanization before it is completed. It can be completed at a later time under dynamic vulcanization conditions. Those skilled in the art will appreciate the appropriate quantities, types of curatives and extent of mixing time required to carry out the vulcanization of the rubber. Where necessary the rubber alone can be vulcanized using varying amounts of curative to determine the optimum cure system to be utilized and the appropriate cure conditions to achieve a full cure.

While it is preferred that all components be present in the mix prior to carrying out the dynamic vulcanization process of this invention, this is not a necessary condition. For example, in one embodiment, the chloromethylated(styrene-isobutylene) polymer to be cured can be dynamically vulcanized in the presence of a portion or all of the resin. This blend can then be let down into additional resin. Similarly, it is not necessary to add all of the fillers and oil prior to dynamic vulcanization. A portion or all of the additives, fillers and oil can be added during or after the vulcanization is completed. Certain ingredients, such as stabilizers and process aids function more effectively if they are added after curing.

The term "rubber" is used herein interchangeably with "elastomer." The term "fully vulcanized" as used herein with respect to the dynamically vulcanized rubber components of this invention means that the rubber components to be vulcanized have been cured to a state in which the physical properties of the rubber are developed to impart elastomeric properties to the rubber generally associated with the rubbers in their conventionally vulcanized state. The degree of cure of the vulcanized rubber can be described in terms of gel content or conversely extractable components. Alternatively, the degree of cure can be expressed in terms of cross-link density.

Where the determination of extractables is an appropriate measure of the state of cure, the improved thermoplastic elastomeric compositions are produced by vulcanizing the curable rubber components of the blends to the extent that they contain no more than four percent by weight of the cured rubber components extractable at room temperature by a solvent which dissolves the rubbers which are intended to be vulcanized, and preferably to the extent that the composition contains less than two percent by weight extractable. In general, the less extractables of the cured rubber components, the better are the properties and still more preferable are compositions comprising essentially no extractable rubber from the cured rubber phase (less than 0.5 wt %). Gel content reported as percent gel is determined by a procedure which comprises determining the amount of insoluble polymer by soaking the specimen for 48 hours in organic solvent at room temperature and weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the composition soluble in organic solvent as well as that of any rubber component, if optionally present, of the DVA which is not intended to be cured. Any insoluble pigments, fillers, etc., are subtracted from both the initial and final weights.

To employ cross-link density as the measure of the state of cure which characterizes the improved thermoplastic elastomeric compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater than $3 \times 10^{-5}$ moles per milliliter of rubber and preferably greater than $5 \times 10^{-5}$ or even more preferably $1 \times 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics. However, it should not be assumed from the fact that the amount of curative is based on the rubber content of the blend and is that amount which gives the rubber alone the its cross-link density, that the curative does not react with the resin or that there is no reaction between the resin and rubber. There may be highly significant reactions involved but of limited extent. However, the assumption that the crosslink density determined as described provides a useful approximation of the cross-link density of the thermoplastic elastomeric compositions is consistent with the thermoplastic properties and with the fact that a large proportion of the resin can be removed from the composition by high temperature solvent extraction, with an appropriate solvent for the resin being used.

The cross-link density of the rubber is determined by equilibrium solvent swelling using the Flory-Rehner equation, as shown in 30 J. RUBBER CHEM. & TECH. 929. The appropriate Huggins solubility parameters for rubber solvent pairs used in the calculation were obtained from the review article by Sheehan and Bisio, 39 RUBBER CHEM. & TECH. 149–192 (1966). If the extracted gel content of the vulcanized rubber is low, it is necessary to use the correction of Bueche wherein the term v is multiplied by the gel fraction (% gel/100). The cross-link density is half the effective network chain density v determined in the absence of resin. The cross-link density of the vulcanized blends will, therefore, be hereinafter understood to refer to the value determined on the same rubber as in the blend in the manner described. Still more preferred compositions meet both of the aforedescribed measures of state of cure, namely, by estimation of cross-link density and percent of rubber extractable.

The thermoplastic resin and chloromethylated(styrene-isobutylene) polymer may also be blended according to the methods disclosed in EP 969 039A1 which results in a fine dispersion of the chloromethylated(styrene-isobutylene) polymer within thermoplastic resin matrix.

Industrial Applicability

It has been found that blending chloromethylated(styrene-isobutylene) tetramer with a thermoplastic resin selected from the group consisting of polyamides, polyesters, polycarbonates, polysulfones, polyacetals, polyacetones, acrylonitrile-butadiene styrene resins, polyphenylene oxide, polyphenylene sulfide, styrene-acrylonitrile resins, styrene-maleic anhydride resins, polyamides, aromatic polyketones, ethylene vinyl alcohol polymer and mixtures thereof, produces a thermoplastic elastomer composition with improved durability and gas permeation. By molding the thermoplastic elastomer composition obtained into a sheet, film, or tube using a T-sheeting die, straight or crosshead structure tubing die, inflation molding cylindrical die, etc. at the end of the single-screw extruder, it is possible to use the resin as an innerliner or the air permeation preventive layer of the pneumatic tire and the rubber/resin laminate of a hose etc.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

What is claimed is:

1. A tire comprising a composition comprising a blend of homogenous chloromethylated (styrene-isobutylene) copolymer and a thermoplastic resin selected from the group consisting of polyamides, polyesters, polycarbonates, polysulfones, polyacetals, polyacetones, acrylonitrile-butadiene styrene resins, polyphenylene oxide, polyphenylene sulfide, styrene-acrylonitrile resins, styrene-maleic anhydride resins, aromatic polyketones, ethylene vinyl alcohol polymer and mixtures thereof.

2. The tire of claim 1, wherein the chloromethylated (styrene-isobutylene)copolymer is comprised of isobutylene derived units, styrene derived units, p-(chloromethyl)styrene derived units, and m-(chloromethyl)styrene derived units.

3. The tire of claim 2, wherein the chloromethylated derived units comprise greater than 0.5 wt % of the chloromethylated (styrene-isobutylene)copolymer.

4. The tire of claim 3, wherein the chloromethylated (styrene-isobutylene)copolymer is at least partially vulcanized.

5. The tire of claim 3, wherein the chloromethylated (styrene-isobutylene)copolymer is at least 90% vulcanized.

6. The tire of claim 1, wherein the composition is a non-vulcanized composition.

7. The tire of claim 1, wherein the composition is a vulcanized composition.

8. The tire of claim 7, wherein the vulcanized composition is a dynamically vulcanized composition.

9. The tire of claim 1, wherein the thermoplastic resin is present in an amount ranging from 10 to 98 wt %, and the chloromethylated(styrene-isobutylene)copolymer is present in an amount ranging from 2 to 90 wt %, based on the blend.

10. The tire of claim 1, wherein the thermoplastic resin is present in an amount ranging from 20 to 95 wt %, and the chloromethylated(styrene-isobutylene)copolymer is present in an amount ranging from 5 to 80 wt %, based on the blend.

11. The tire of claim 1, wherein the chloromethylated (styrene-isobutylene)copolymer is present in the composition as particles dispersed in the resin.

12. The tire of claim 1, wherein the thermoplastic resin comprises a polyamide.

13. The tire of claim 12, wherein the polyamide is selected from the group consisting of Nylon 6, Nylon 6,6; Nylon 6/66, Nylon 11 and mixtures thereof.

14. The tire of claim 1, wherein the chloromethylated (styrene-isobutylene)copolymer comprises from above zero to 10 wt % chlorine.

15. The tire of claim wherein the chloromethylated (styrene-isobutylene)copolymer comprises from 1 to 30 mole percent styrene.

16. The tire of claim 1, wherein the chloromethylated (styrene-isobutylene)copolymer comprises from 0.5 to 10 mole percent chloromethylated styrene.

17. The tire of claim 1, additionally comprising a component selected from the group consisting of a filler, a rubber compounding additive, and mixtures thereof.

18. The tire of claim 1, additionally comprising a component selected from the group consisting of rubber processing oils, plasticizers, and mixtures thereof.

19. The tire of claim 1, wherein the composition has a secant flexural modulus ranging from 100 to 400,000 kg/cm$^2$ measured according to ASTM D 790 at 1% strain.

20. A tire comprising a composition comprising a blend of homogenous chloromethylated(styrene-isobutylene) copolymer and a thermoplastic resin selected from the group consisting of polyamides, ethylene vinyl alcohol polymer and mixtures thereof, wherein the chloromethylated (styrene-isobutylene) polymer comprises from 1 to 30 mole percent styrene and from 0.5 to 10 mole percent chloromethylated styrene.

21. A tire comprising a composition comprising a blend of homogenous chloromethylated(styrene-isobutylene) copolymer and a polyamide resin selected from the group consisting of polycaprolactam (Nylon-6), polylauryllactam (Nylon-12), polyhexamethyleneadipamide (Nylon-6,6), poly-hexamethyleneazelamide (Nylon-6,9), polyhexamethylenesebacamide (Nylon-6,10), polyhexamethyleneisophthalamide (Nylon-6,IP), poly-(11-amino-undecanoic acid (Nylon-11), Nylon 6 (N6), Nylon 11 (N11), Nylon 12 (N12), a Nylon 6/66 (N6/66), Nylon 610 (N610), Nylon 612 (N612), and mixtures thereof.

22. An air permeation prevention film, the film comprising a composition comprising a blend of homogenous chloromethylated (styrene-isobutylene)copolymer and a thermoplastic resin selected from the group consisting of polyamides, polyesters, polycarbonates, polysulfones, polyacetals, polyacetones, acrylonitrile-butadiene styrene resins, polyphenylene oxide, polyphenylene sulfide, styrene-acrylonitrile resins, styrene-maleic anhydride resins, aromatic polyketones, ethylene vinyl alcohol polymer and mixtures thereof.

23. The air permeation prevention film of claim 22, wherein the chloromethylated (styrene-isobutylene) copolymer is comprised of isobutylene derived units, styrene derived units, p-(chloromethyl)styrene derived units, and m-(chloromethyl)styrene derived units.

24. The air permeation prevention film of claim 23, wherein the chloromethylated derived units comprise greater than 0.5 wt % of the chloromethylated (styrene-isobutylene)copolymer.

25. The air permeation prevention film of claim 24, wherein the chloromethylated(styrene-isobutylene) copolymer is at least partially vulcanized.

26. The air permeation prevention film of claim 24, wherein the chloromethylated(styrene-isobutylene) copolymer is at least 90% vulcanized.

27. The air permeation prevention film of claim 22, wherein the composition is a non-vulcanized composition.

28. The air permeation prevention film of claim 22, wherein the composition is a vulcanized composition.

29. The air permeation prevention film of claim 28, wherein the vulcanized composition is a dynamically vulcanized composition.

30. The air permeation prevention film of claim 22, wherein the thermoplastic resin is present in an amount ranging from 10 to 98 wt %, and the chloromethylated (styrene-isobutylene)copolymer is present in an amount ranging from 2 to 90 wt %, based on the blend.

31. The air permeation prevention film of claim 22, wherein the thermoplastic resin is present in an amount ranging from 20 to 95 wt %, and the chloromethylated (styrene-isobutylene)copolymer is present in an amount ranging from 5 to 80 wt %, based on the blend.

32. The air permeation prevention film of claim 22, wherein the chloromethylated(styrene-isobutylene) copolymer is present in the composition as particles dispersed in the resin.

33. The air permeation prevention film of claim 22, wherein the thermoplastic resin comprises a polyamide.

34. The air permeation prevention film of claim 33, wherein the polyamide is selected from the group consisting of Nylon 6, Nylon 6,6; Nylon 6/66, Nylon 11 and mixtures thereof.

35. The air permeation prevention of claim 22, wherein the chloromethylated(styrene-isobutylene)copolymer comprises from above zero to 10 wt % chlorine.

36. The air permeation prevention film of claim 22, wherein the chloromethylated(styrene-isobutylene) copolymer comprises from 1 to 30 mole percent styrene.

37. The air permeation prevention film of claim 22, wherein the chloromethylated(styrene-isobutylene) copolymer comprises from 0.5 to 10 mole percent chloromethylated styrene.

38. The air permeation prevention film of claim 22, additionally comprising a component selected from the group consisting of a filler, a rubber compounding additive, and mixtures thereof.

39. The air permeation prevention film of claim 22, additionally comprising a component selected from the group consisting of rubber processing oils, plasticizers, and mixtures thereof.

40. The air permeation prevention film of claim 22, wherein the composition has a secant flexural modulus ranging from 100 to 400,000 kg/cm$^2$ measured according to ASTM D 790 at 1% strain.

41. An air permeation prevention film, the film comprising a composition comprising a blend of homogenous chloromethylated(styrene-isobutylene)copolymer and a thermoplastic resin selected from the group consisting of polyamides, ethylene vinyl alcohol polymer and mixtures thereof, wherein the chloromethylated(styrene-isobutylene) polymer comprises from 1 to 30 mole percent styrene and from 0.5 to 10 mole percent chloromethylated styrene.

42. An air permeation prevention film, the film comprising a blend of homogenous chloromethylated(styrene-isobutylene)copolymer and a polyamide resin selected from the group consisting of polycaprolactam (Nylon-6), polylauryllactam (Nylon-12), polyhexamethyleneadipamide (Nylon-6,6), poly-hexamethyleneazelamide (Nylon-6,9), polyhexamethylenesebacamide (Nylon-6,10), polyhexamethyleneisophthalamide (Nylon-6,IP), poly-(11-aminoundecanoic acid (Nylon-11), Nylon 6 (N6), Nylon 11 (N11), Nylon 12 (N12), a Nylon 6/66 (N6/66), Nylon 610 (N610), Nylon 612 (N612), and mixtures thereof.

43. A tire innerliner comprising a composition comprising a blend of homogenous chloromethylated styrene-isobutylene)copolymer and a thermoplastic resin selected from the group consisting of polyamides, polyesters, polycarbonates, polysulfones, polyacetals, polyacetones, acrylonitrile-butadiene styrene resins, polyphenylene oxide, polyphenylene sulfide, styrene-acrylonitrile resins, styrene-maleic anhydride resins, aromatic polyketones, ethylene vinyl alcohol polymer and mixtures thereof.

44. The tire innerliner of claim 43, wherein the chloromethylated(styrene-isobutylene)copolymer is comprised of isobutylene derived units, styrene derived units, p-(chloromethyl)styrene derived units, and m-(chloromethyl)styrene derived units.

45. The tire innerliner of claim 44, wherein the chloromethylated derived units comprise greater than 0.5 wt % of the chloromethylated(styrene-isobutylene)copolymer.

46. The tire innerliner of claim 45, wherein the chloromethylated(styrene-isobutylene)copolymer is at least partially vulcanized.

47. The tire innerliner of claim 45, wherein the chloromethylated(styrene-isobutylene)copolymer is at least 90% vulcanized.

48. The tire innerliner of claim 43, wherein the composition is a non-vulcanized composition.

49. The tire innerliner of claim 43, wherein the composition is a vulcanized composition.

50. The tire innerliner of claim 49, wherein the vulcanized composition is a dynamically vulcanized composition.

51. The tire innerliner of claim 43, wherein the thermoplastic resin is present in an amount ranging from 10 to 98 wt %, and the chloromethylated(styrene-isobutylene) copolymer is present in an amount ranging from 2 to 90 wt %, based on the blend.

52. The tire innerliner of claim 43, wherein the thermoplastic resin is present in an amount ranging from 20 to 95 wt %, and the chloromethylated(styrene-isobutylene) copolymer is present in an amount ranging from 5 to 80 wt %, based on the blend.

53. The tire innerliner of claim 43, wherein the chloromethylated(styrene-isobutylene)copolymer is present in the composition as particles dispersed in the resin.

54. The tire innerliner of claim 43, wherein the thermoplastic resin comprises a polyamide.

55. The tire innerliner of claim 54, wherein the polyamide is selected from the group consisting of Nylon 6, Nylon 6,6; Nylon 6/66, Nylon 11 and mixtures thereof.

56. The tire innerliner of claim 43, wherein the chloromethylated(styrene-isobutylene)copolymer comprises from above zero to 10 wt % chlorine.

57. The tire innerliner of claim 43, wherein the chloromethylated(styrene-isobutylene)copolymer comprises from 1 to 30 mole percent styrene.

58. The tire innerliner of claim 43, wherein the chloromethylated(styrene-isobutylene)copolymer comprises from 0.5 to 10 mole percent chloromethylated styrene.

59. The tire innerliner of claim 43, additionally comprising a component selected from the group consisting of a filler, a rubber compounding additive, and mixtures thereof.

60. The tire innerliner of claim 43, additionally comprising a component selected from the group consisting of rubber processing oils, plasticizers, and mixtures thereof.

61. The tire innerliner of claim 41, wherein the composition bas a secant flexural modulus ranging from 100 to 400,000 kg/cm$^2$ measured according to ASTM D 790 at 1% strain.

62. A tire innerliner comprising a composition comprising a blend of homogenous chloromethylated(styrene-isobutylene)copolymer and a thermoplastic resin selected from the group consisting of polyamides, ethylene vinyl alcohol polymer and mixtures thereof, wherein the chloromethylated(styrene-isobutylene)copolymer comprises from 1 to 30 mole percent styrene and from 0.5 to 10 mole percent chloromethylated styrene.

63. A tire innerliner comprising a blend of homogenous chloromethylated(styrene-isobutylene)copolymer and a polyamide resin selected from the group consisting of polycaprolactam (Nylon-6), polylauryllactam (Nylon-12), polyhexamethyleneadipamide (Nylon-6,6), polyhexamethyleneazelamide (Nylon-6,9), polyhexamethylenesebacamide (Nylon-6,10), polyhexamethyleneisophthalamide (Nylon-6,IP), poly-(11-aminoundecanoic acid (Nylon-11), Nylon 6 (N6), Nylon 11 (N11), Nylon 12 (N12) a Nylon 6/66 (N6/66), Nylon 610 (N610), Nylon 612 (N612), and mixtures thereof.

\* \* \* \* \*